United States Patent [19]
Schloesser

[11] Patent Number: 5,851,146
[45] Date of Patent: Dec. 22, 1998

[54] SYSTEM FOR THRESHING PODDED PRODUCE

[75] Inventor: Cristopher M. Schloesser, Watertown, Wis.

[73] Assignee: Byron Enterprises, Inc., Byron, N.Y.

[21] Appl. No.: 869,017

[22] Filed: Jun. 4, 1997

[51] Int. Cl.⁶ ..................................................... A01F 11/00
[52] U.S. Cl. ........................................... 460/142; 460/141
[58] Field of Search ..................................... 460/142, 141, 460/149, 150, 901, 107, 108, 113, 119; 56/327.1

[56] References Cited

U.S. PATENT DOCUMENTS

| | | |
|---|---|---|
| 2,934,072 | 4/1960 | Mather et al. ....................... 460/142 X |
| 3,709,231 | 1/1973 | Looker et al. . |
| 3,826,267 | 7/1974 | Scribner . |
| 5,052,976 | 10/1991 | van de Brand ............................ 460/14 |
| 5,372,547 | 12/1994 | Brown et al. . |

FOREIGN PATENT DOCUMENTS

WO 96/26635   9/1996   WIPO .

*Primary Examiner*—Terry Lee Melius
*Attorney, Agent, or Firm*—M. LuKacher; K. LuKacher

[57] ABSTRACT

A system for threshing podded produce such as peas and beans, which may be harvested with their vine attached. A horizontal, cylindrical, rotating screen encloses a main beater having numerous paddles of height about one-twelfth the beater diameter. Paddles are pitched at an angle of about 25 degrees to a plane including the axis of the main beater and are also raked backwards by about 15 degrees from radial. A counter-rotating first satellite beater disposed above the main beater collects produce which has been macerated between the main beater and the screen and cooperates with the main beater, the linear tip speeds of the paddles and blades of both beaters being identical, to discharge a radially narrow, high-speed stream of macerated material across the interior of the cylindrical screen against a first sieving region of the screen above a second satellite beater. The second satellite beater cooperates with a counter-rotating third satellite beater, the linear tip speeds of the blades of both beaters being similar, to discharge a radially narrow, high-speed stream of macerated material to strike against the main beater, from which the material is thrown by the main beater against the screen at a second sieving region of the rotating screen near the lowest point thereof. Macerated produce is carried upwards again by the screen into the nip between the main beater and screen, beginning another macerating and sieving cycle. A threshing system in accordance with the invention may subject produce to 10–15 such sieving cycles and therefore has a very high percentage yield of seeds.

29 Claims, 5 Drawing Sheets

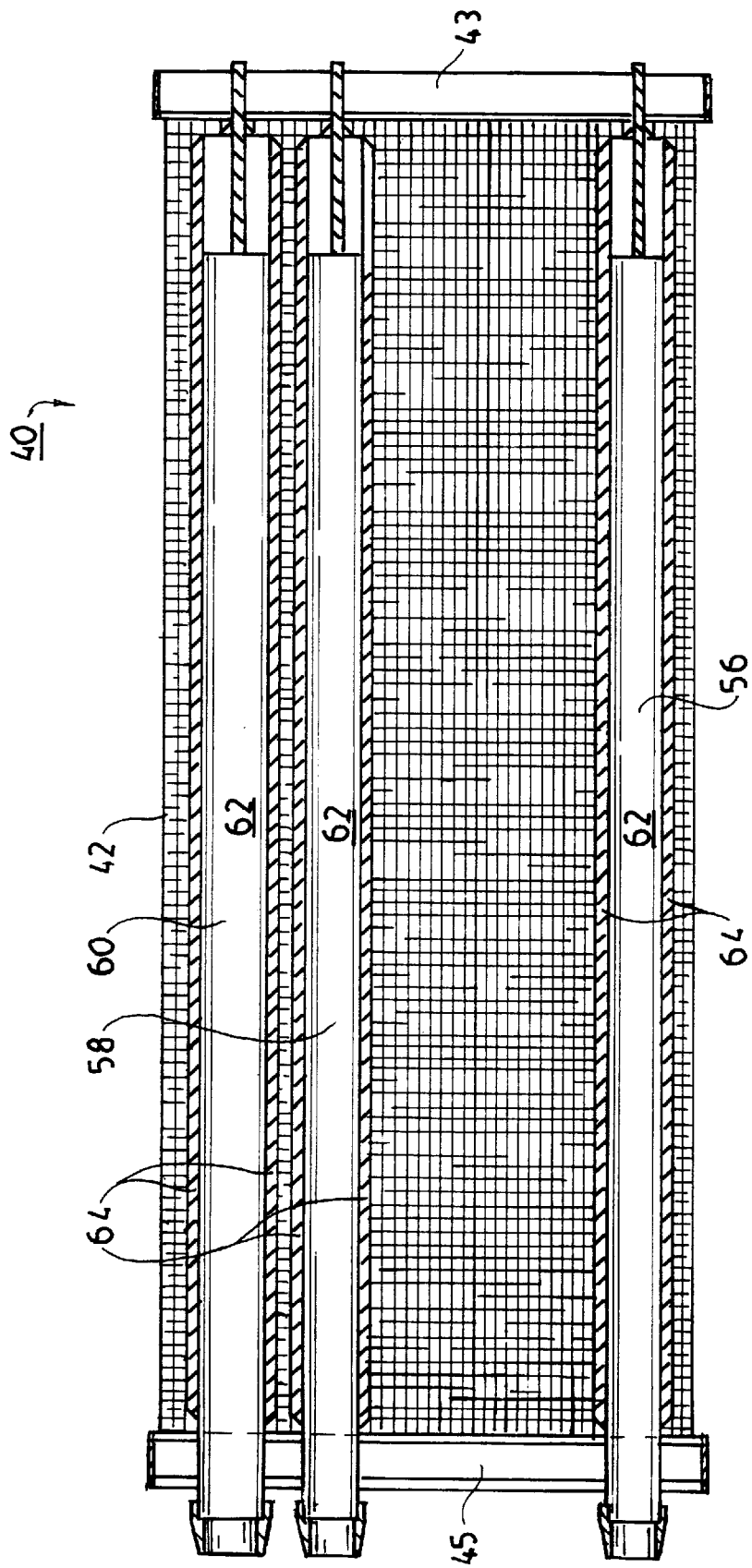

SYSTEM FOR THRESHING PODDED PRODUCE

DESCRIPTION

The present invention relates to apparatus for threshing podded crops such as peas and beans, more particularly to apparatus for opening the pods of such crops and for separating the shelled seeds from the pods and vines, and most particularly to apparatus for shelling freshly harvested peas and beans in the field.

Rotary threshers for shelling vined podded crops such as peas and beans typically include a rotating cylindrical screen for sieving the peas or beans (referred to herein generically as "seeds") from the opened pods and from the macerated vine material. Rotating within the screen are one or more longitudinal "beaters" consisting generally of a tubular body and a plurality of radially-extending continuous longitudinal fins or blades. There may be a "main" beater of substantially larger diameter than one or more "satellite" beaters, the satellite beaters cooperating with the main beater in any of several flow schemes to macerate the plants, to break open the pods and remove the seeds therefrom by squeezing and/or throwing the pods against the screen, to sieve the seeds through the screen, to collect the seeds, and to discharge the macerated waste. In general, the various proposed threshers differ in the placement of the beaters within the screen, the rotational frequencies of the beaters with respect to each other and with respect to the cylindrical screen, and the length, shape, and number of the beater blades.

Examples of some proposed threshers are disclosed in U.S. Pat. Nos. 3,709,231 issued Jan. 9, 1973 to Looker et al.; 3,826,267 issued Jul. 30, 1974 to Scribner; 5,372,547 issued Dec. 13, 1994 to Brown et al.; and PCT Application No. WO 96/26635 filed Feb. 29, 1996 by Pixall Limited Partnership. The proposed machines have various shortcomings.

Both the Looker et al. '231 machine and the Scribner '267 machine waste ⅓ of a revolution of the screen before the first contact of a beater with the incoming vines, and they rely on friction and centrifugal force on the screen alone to carry the vines upward to the first beater. The central main beater has only six continuous blades and the auxiliary beaters only four, which can lead to wadding and clumping of the macerated produce, resulting in uneven distribution of the produce on the inner wall of the screen and lessened opportunity for seeds to find exit openings. The blades have recurvent ends which can trap produce and thereby facilitate mildew and spoilage.

The Brown et al. '547 machine relies on the vibration of long, flexible "fingers" on a main beater to open pods rather than on high speed flinging or compressing of the pods. Vines may become tangled on the fingers, which do not have true macerating capability, and the machine may thereby become clogged.

The Pixall '635 machine is purported to compress the air trapped inside pods to force the pods open and release the seeds. It specifically does not use percussive force to open the pods. However, in many podded legumes, particularly when the seeds are immature but highly desirable for human consumption, there is virtually no air present within the pods. This machine may not be successful in opening such pods, or may crush and unacceptably damage the seeds while attempting to open the pods.

A proposed machine of particular interest is disclosed in U.S. Pat. No. 5,052,976 issued Oct. 1, 1991 to van de Brand. The machine includes a conventional rotating cylindrical screen and rotating beaters within the screen. The main threshing means, however, is provided not with conventional longitudinal blades but with a plurality of longitudinally short, discrete blades disposed on a cylindrical body or hub. The paddles are oriented on the body such that each one encloses an angle with a plane extending through the longitudinal axis of the main beater (herein referred to as "pitch"), so that when the main beater is rotated, the crop is directed not only transverse of the screen but also in the longitudinal direction of the screen. Thus the crop is gradually moved in a generally helical path through a series of threshing cycles from one end of the screen to the other.

The vined podded produce is introduced at the low point of the screen and is immediately engaged by the main beater which, rotating in the same direction as the screen and faster than the screen, rubs the pods and vines against the screen to partially shred the produce and release some of the seeds while simultaneously raising the produce along the screen's inner wall. The produce is thus presented to a first auxiliary threshing means disposed above the main threshing means and rotatably driven in the same rotational direction as the main threshing means and the screen. The first auxiliary thresher further rubs and shreds the produce against the screen wall to support and add to the threshing action of the main thresher. Produce exiting the first auxiliary thresher is thrown in a broad band across and downwardly within the rotating screen to spread the macerated produce on the screen. A second auxiliary threshing means is disposed across the threshing space within the screen from the first auxiliary thresher and main thresher. The second auxiliary thresher is disposed close to the screen and is rotatably driven counter to the direction of rotation of the screen. The second auxiliary thresher thus collects that portion of the produce being carried along the inner surface of the screen ahead of the second auxiliary thresher and flings it in redirected, a broad band back across the threshing space, causing some produce to strike the main thresher, where it is further macerated and thrown against the screen surface near the low point, while other of the produce strikes the screen surface directly from the second auxiliary thresher. Further of the released seeds are sieved thereby. The macerated produce, having been displaced axially of the screen by the pitch of the main thresher paddles, is again taken up by the main thresher, and another cycle is begun.

The first and second auxiliary threshers are each provided with a longitudinal body having a generally square cross-sectional shape and with a longitudinal rod mounted as an impeller blade at each corner of the square. Each satellite auxiliary thresher thus has only four blades.

A threshing apparatus in accordance with the van de Brand '976 disclosure has at least three distinct shortcomings. First, the main thresher paddles are too high relative to the overall diameter of the main thresher, so that much of the produce can travel around the main thresher without being compressed, macerated, and rubbed against the screen wall. Second, both the first and second auxiliary threshers lose effectiveness by spraying produce over a broad band of exit angles; thus, much of the produce does not strike the opposite screen wall at the proper angle or with sufficient force to open additional pods. Third, the auxiliary threshers have only four blades, resulting in a substantially clumped flow of material which therefore is sub-optimally spread on the screen surface and may be too thick over much of its area to permit high yield sieving of free seeds.

It is a principal object of the invention to provide an improved threshing system for podded produce wherein pods are more vigorously rubbed against a rotating screen to more effectively open the pods and release the seeds.

It is a further object of the invention to provide an improved threshing system for podded produce wherein the pods are thrown against the inner wall of the screen a plurality of times at a high velocity and a high incident angle.

It is a still further object of the invention to provide an improved threshing system for vined podded produce wherein macerated produce including free seeds is sprayed in a continuous, relatively thin layer over the inner surface of a rotating screen in at least two regions to permit high-efficiency sieving of free seeds through the screen.

Briefly described, a system for threshing peas in accordance with the invention includes a horizontal, cylindrical, rotating screen enclosing a main beater. The mechanisms for supporting, driving, and conveying the actual threshing apparatus may be of the type disclosed in U.S. Pat. No. : 5,052,976 and elsewhere in the prior art and need not be discussed further herein. The paddles of the main beater in accordance with the invention are more numerous and shorter in height relative to the overall diameter of the beater than those disclosed in the '976 patent, paddle height being no more than one-fifth the beater diameter and preferably about one-twelfth. This causes pods entrained by the paddles between the main beater body and the rotating screen to be more vigorously rubbed, compressed, and shredded by the main beater than can occur in a known apparatus. Paddles in accordance with the invention are pitched at an angle to a plane including the axis of the main beater, the included angle being at least 15 degrees and preferably about 25 degrees. The paddles are also mounted at an angle to a radius of the main beater such that the face of the paddle is raked backwards or negatively to the direction of travel by an angle of at least 10 degrees, and preferably at an angle of about 15 degrees.

A counter-rotating first satellite beater disposed above the main beater and in close proximity to the screen has longitudinal blades which collect macerated produce which has been macerated between the main beater and the screen. The first satellite beater cooperates with the main beater to discharge a radially narrow stream of macerated material across the interior of the cylindrical screen against a first sieving region of the screen above a second satellite beater. Preferably, the rotational frequency of the first satellite beater and the main beater are selected so that the linear tip speeds of the paddles and blades of both beaters are identical, causing the discharged stream to be radially narrow and well defined.

Macerated produce which does not pass through the screen at the first sieving region is carried downwards by the rotation of the screen to a counter-rotating third satellite beater in close proximity to the screen, which beater collects macerated produce from the screen and cooperates with the second satellite beater to discharge a radially narrow stream of macerated material to strike against the main beater, from which the material is thrown by the main beater against the screen at a second sieving region of the rotating screen near the lowest point thereof. Preferably, the rotational frequency of the second satellite beater and the third satellite beater are selected so that the linear tip speeds of the blades of both beaters are identical and so that virtually all of the macerated produce is directed in a well defined, radially narrow stream against the main beater.

Macerated produce which does not pass through the screen at the second sieving region is carried upwards again by rotation of the screen into the nip between the main beater and screen, beginning another macerating and sieving cycle.

A threshing system in accordance with the invention may subject produce to 10–15 such sieving cycles and therefore has a very high percentage yield.

Conventional aprons, winnowers, and conveyors outside the screen collect, clean, and transport the sieved seeds for further processing, and need not be discussed further herein.

All three of the satellite beaters are provided with at least six longitudinal blades, and preferably eight, as opposed to four blades in the known art. Each blade is relatively shallow, less than four inches in radial height and preferably about two inches. The combination of low blade capacity and large number of blades assures a very smooth, steady flow of material onto the screen at the first and second sieving regions, providing an even thickness and eliminating the pulsating flow and concomitant thickness and sieving variations experienced by known apparatus.

The foregoing and other objects, features, and advantages of the invention, as well as presently preferred embodiments thereof, will become more apparent from a reading of the following description in connection with the accompanying drawings in which:

FIG. 5 is a view taken along line 5—5 in FIG. 2.

Figure 1:
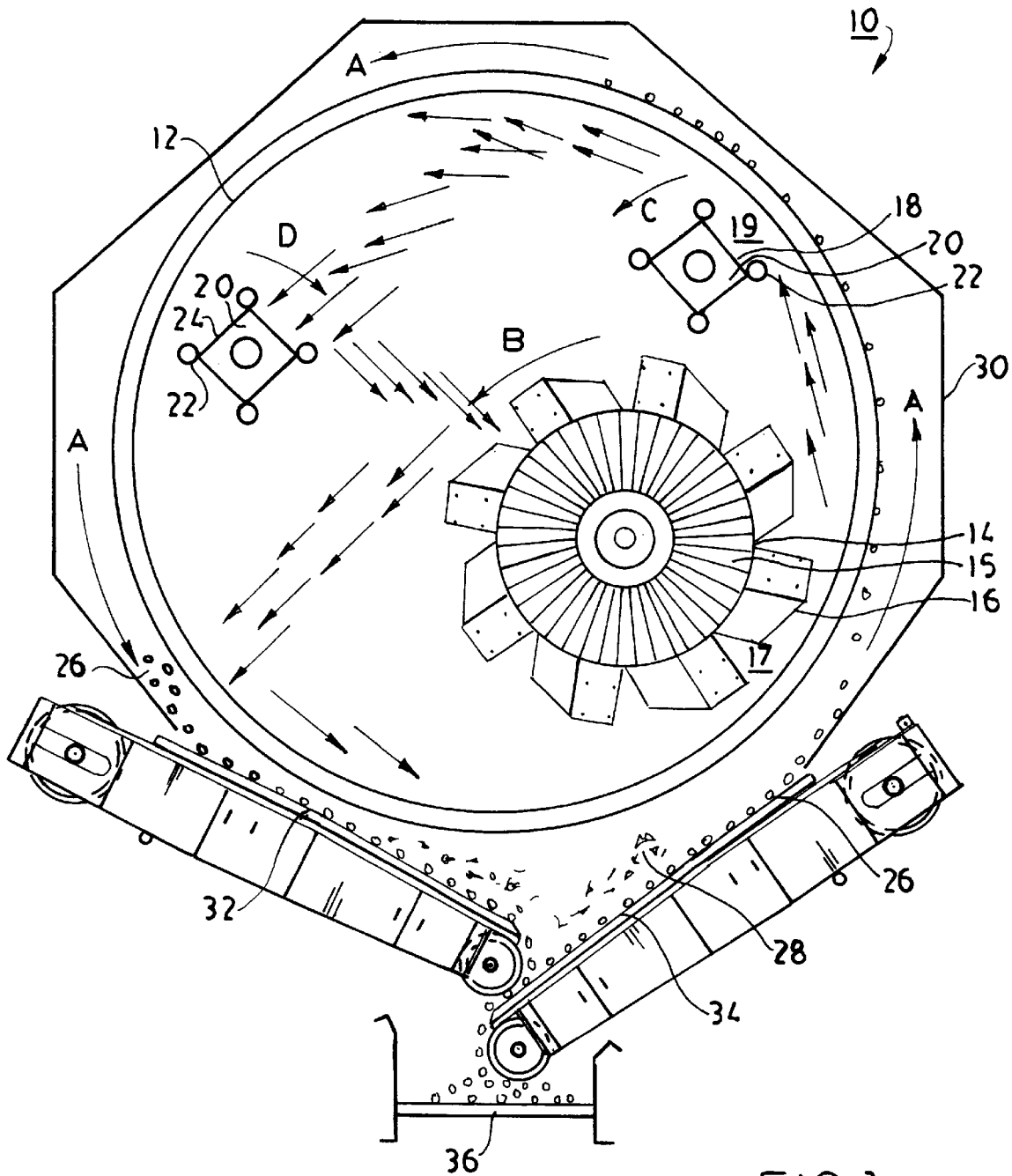
FIG. 1 is cross-sectional elevational view of a known threshing apparatus.

Referring to FIG. 1, there is shown a known apparatus 10 for threshing vined podded produce such as peas and beans, of the general type as disclosed in U.S. Pat. No. 5,052,976. A brief description of this apparatus will be helpful in understanding the improvements and advantages of the present invention as described hereinbelow.

A cylindrical screen 12 extending longitudinally of the apparatus is mounted for rotation in a counterclockwise direction (arrow A). Screen 12 is supported on rollers (not shown here for clarity) which may be supported on a frame and driven as disclosed in the incorporated '976 reference. In operation, screen 12 is provided with a continuous supply of vined podded produce at or near the low point of the proximal end of the cylinder by conventional means.

Within cylindrical screen 12 is arranged a main threshing beater 14 which comprises an elongated, substantially cylindrical a body 15, on the outer surface of which there are provided outwardly extending paddles 16 which are pitched with respect to the axis of the main beater so that when the main beater is rotated in the direction of arrow B during operation, the produce is directed not only toward sieves forming the inner surface of screen 12 but also in the longitudinal direction of the screen, so that the crop will gradually be moved from the one end of screen 12 towards the other end. The main beater 14 is arranged and rotated such that paddles 16 are disposed near a lower part of the screen surface and move upwards with the screen surface during operation to macerate, compress, and rub vined produce against screen 12 in region 17.

Also within cylindrical screen 12 is arranged a first satellite beater 18 generally above main beater 14. Satellite beater 18 comprises an elongated, rectangular body 20 supporting a rod-shaped blade 22 at each of the four corners. Satellite beater 18 is driven counterclockwise in the direction of arrow C, by means of which produce is moved along and rubbed against the inner wall of screen 12 in region 19 during operation and is then flung at a broad range of angles against the inner surface of screen 12 to open additional pods and to release additional seeds.

Also within cylindrical screen 12 is arranged a second satellite beater 24 which is rotatable in a direction according to arrow D about its longitudinal axis extending parallel to the axis of screen 12. The design of second satellite beater 24 is similar to that of the first satellite beater 18. Second satellite beater 24 is located near that part of the screen surface that moves downwards during operation. Second satellite beater 24 collects produce flung by first satellite beater 18 and in turn flings the produce against the side of main beater 14 opposite region 17. Main beater 14 in turn flings the produce against the screen surface to further macerate the produce and to sieve additional seeds. Macerated product is then carried upwards by the screen into region 17, and another threshing cycle is begun. A plurality of such cycles may be necessary to completely thresh the pods in a particular crop; typically, such a machine may be operated to provide 20–30 cycles, at the end of which the spent produce is discharged from the distal end of the screen.

Seeds 26 and small chaff 28 which have passed through the screen are restrained and directed outside the screen by shroud 30 onto first and second angled transverse conveyors 32 and 34, respectively, and thence to longitudinal conveyor 36 for transport to a receptacle (not shown). The chaff may be winnowed from the peas in known fashion (not shown).

Figure 2:
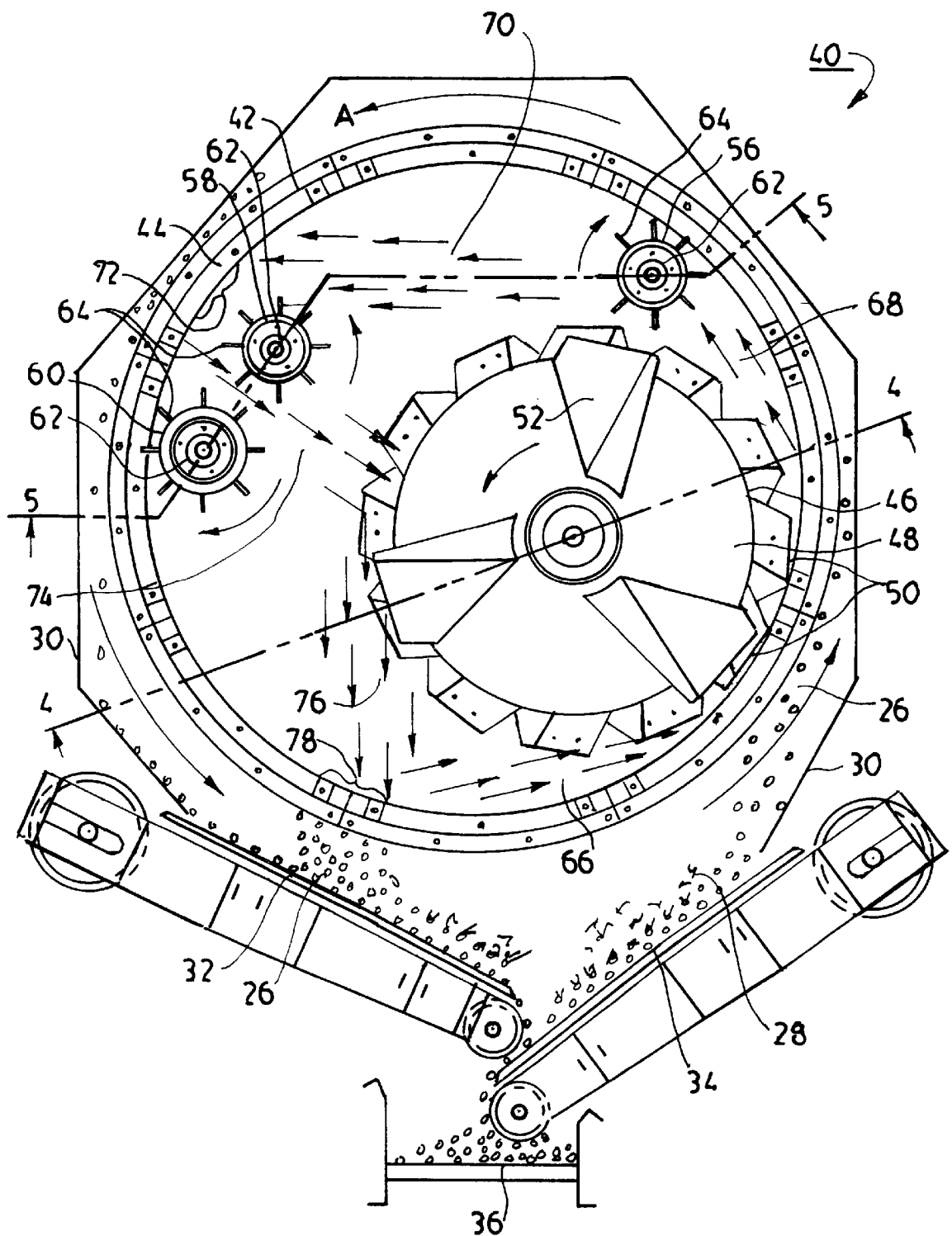
FIG. 2 is a cross-sectional elevational view of a threshing apparatus in accordance with the present invention.
Figure 3:
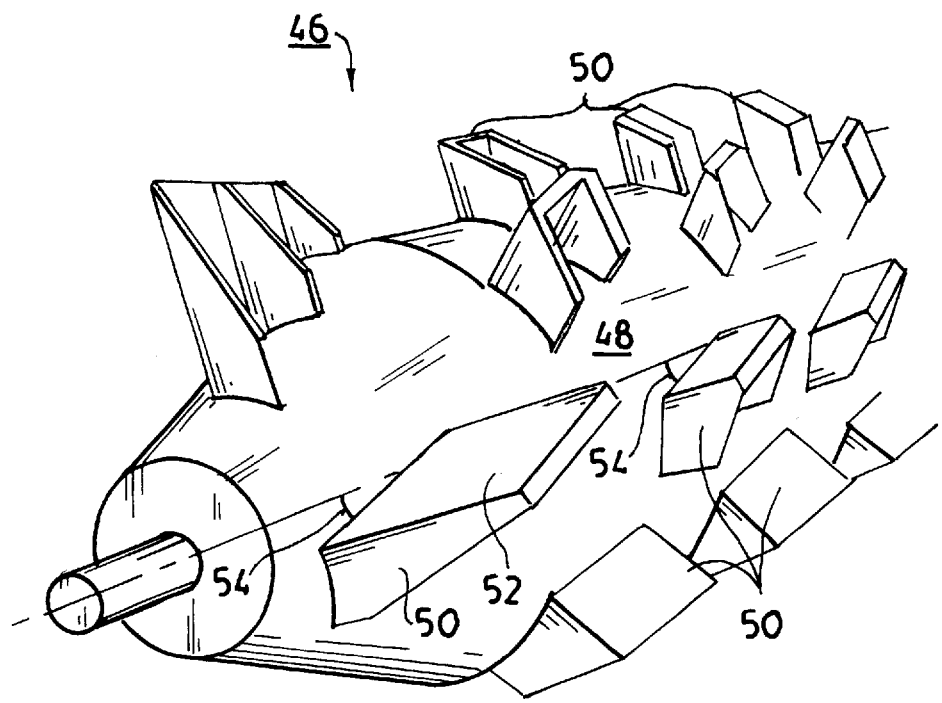
FIG. 3 is a perspective view from the rear of a main beater in accordance with the invention.

Referring to FIGS. 2 through 5, a system 40 for threshing vined podded crops in accordance with the invention is shown. The views in FIGS. 2 and 3 are from the rear, or distal, end of the apparatus looking towards the front, or proximal, end. A cylindrical screen 42, or drum, is mounted for anti-clockwise rotation like screen 12. Screen 42 is supported by a plurality of spaced-apart curved ribs 44 along its axial length. In a preferred embodiment, ribs 44 are disposed on the outside of screen 42 so that a smooth sieving surface may be presented to the interior of the screen. The sieving perforations in the screen are preferably about $5/8$ inches in diameter. Screen 42 and ribs 44 may be rotatably supported, rotated, and driven as disclosed in the '976 reference.

Figure 4:
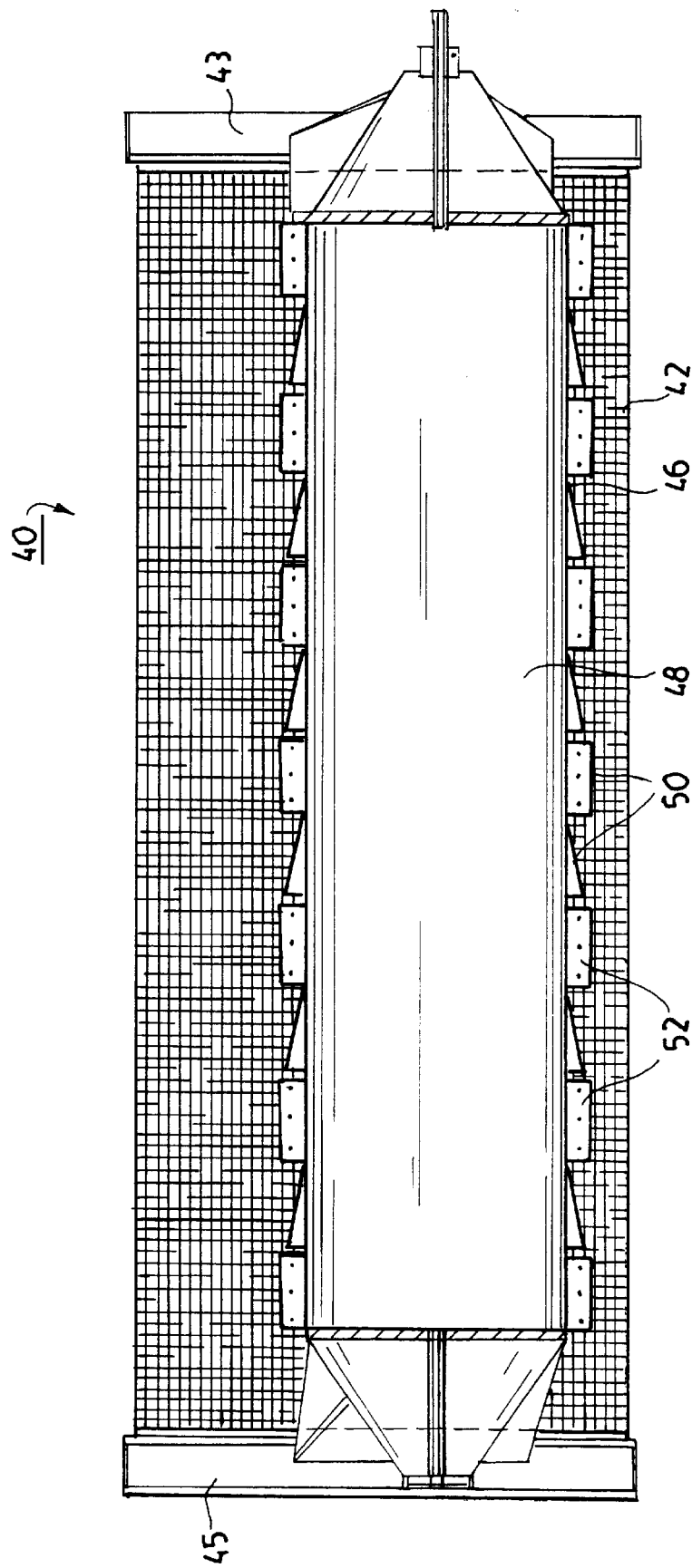
FIG. 4 is a view taken along line 4—4 in FIG. 2.

Within cylindrical screen 42 is disposed a main threshing beater 46, similar to beater 14, having a longitudinal axis parallel with, and preferably lower than, the axis of cylindrical screen 42. Main beater 46 is rotatably supported at its ends in bearings (not shown) and is driven at its rear end at a variable and preset frequency of rotation preferably by a hydraulic motor (not shown). Main beater 46 has a generally cylindrical body 48 extending substantially the full length of screen 42 which may be tapered or streamlined at either or both ends as shown in FIGS. 3 and 4. Beater 46 is provided with a plurality of paddles 50, for example, 77 paddles, extending outwards from body 48, similarly to paddles 16 of main beater 12, such that during rotation of the beater the paddles pass in close proximity to the inner surface of screen 42, preferably within about $3/4$ inch.

Paddles 50 are disposed on body 48 such that faces 52 include an angle 54 with a plane containing the axis of main beater 46, which angle is at least 10 degrees and preferably is about 25 degrees. In addition, faces 52 are also disposed at an angle to a radius of main beater 46 such that the face of the paddle is raked backwards or negatively to the direction of rotation by an angle of at least 10 degrees, and preferably at an angle of about 15 degrees.

The relationship of the height of paddles 50 to the overall diameter of main beater 46 is an important consideration and a distinction from beater 14. I have found that increased plant maceration and release of seeds from their pods is achieved when the height of the paddles is reduced to no more than $1/5$ the diameter of the main beater, and preferably about $1/12$. For example, a main beater having an overall diameter of 48 inches might have paddles extending 4 inches above the non-tapered portion of the surface of body 48.

Disposed within screen 42 and generally above main beater 46 in close proximity to screen 42 are first, second, and third satellite beaters 56, 58, and 60, respectively. Each satellite beater is mounted in bearings at each end (not shown) for rotation about a longitudinal axis parallel with the axes of screen 42 and main beater 46 and each is substantially coextensive therewith. First and third satellite beaters may be driven clockwise, and second satellite beater may be driven anti-clockwise, each at a variable and preset frequency of rotation by a conventional drive means (not shown), preferably by individual hydraulic motors. Each satellite beater has a generally cylindrical body 62, as shown in FIG. 5, and is provided with a plurality of longitudinal blades 64, numbering at least 6 and preferably 8. Blades 64 are preferably flat and radial, unlike blades 22, and are continuous over substantially the length of body 62. Preferably, the radial dimension (height) of blades 64 is relatively small, in the range of between 2 and 4 inches. First and third satellite beaters 56 and 60 are located in close proximity to the inner surface of screen 42 such that, during operation, the tips of blades 64 pass within less than one inch of screen 42, preferably within about $3/4$ inch.

First satellite beater 56 is disposed generally above main beater 46 such that, during operation, the tips of blades 64 nearly touch the tips of paddles 50, allowing the two beaters which are rotating counter to each other to function similarly to a two-gear pump to discharge macerated produce in a radially narrow, well-defined stream, unlike the broad spray discharged by first auxiliary thresher 18 in known apparatus 10.

Second satellite beater 58 is off-spaced from screen 42 and is disposed across the threshing space in screen 12 intermediate in elevation between first satellite beater 56 and main beater 46.

Third satellite beater 60 is disposed generally below second satellite beater 58 such that, during operation, the tips of blades 64 of the two beaters nearly touch each other, allowing the two beaters which are rotating counter to each other to function similarly to a two-gear pump to discharge macerated produce in a radially narrow, well-defined stream.

Preferably, each of beaters 46, 56, 58, and 60 is driven by a separate hydraulic motor, the rotational speeds of which may be controlled and independently set by a controller (not shown) to provide desired linear tip speeds of the paddles and blades of the beaters. Alternatively, the beaters may be linked by a chain or toothed-belt drive in known fashion to achieve the same effect. The rotational speed of each of the beaters may be asynchronous with the rotational speed of screen 42. Preferably, the linear tip speed of paddles 50 is matched to the linear tip speed of blades 64 of first satellite beater 56, and the linear tip speed of blades 64 of second satellite beater 58 is matched to the linear tip speed of blades 64 of third satellite beater 60. Matching the tip speeds is an important feature of the invention in generating a radially narrow, well defined stream of macerated produce.

In operation, pod-bearing vines are presented to the screen 42 at or near the lowest portion thereof at the proximal end 43 of the screen. The vines are carried counterclockwise along first path 66 by rotation of screen 42 and thence into intense maceration, compression, and shredding between main beater 46 and screen 42. Released seeds 26 are sieved through screen 42, retained by shroud 30, and fall to angled conveyor 34. Macerated produce continues along path 68 into the nip between main beater 46 and first satellite beater 56, and is thereby vigorously accelerated and sprayed along path 70 above second satellite beater 58 in a high-speed, radially-narrow, steady stream of macerated material at a high incident angle against screen 42 at a first sieving region 72, thereby opening additional pods and allowing additional free seeds to be sieved through screen 42 where they are restrained by shroud 30 and fall to angled conveyor 32. The remaining macerated produce is carried downwards by the rotation of screen 42, is collected by the counter-rotation of third satellite beater 60, and is again vigorously accelerated and sprayed along path 74 against the side of main beater 46 opposite screen 42, thereby opening additional pods. Main beater 46 again accelerates the remaining macerated produce to a high speed along path 76 to strike screen 42 at a high incident angle at a second sieving region 78, thereby opening additional pods and allowing additional free seeds to be sieved through screen 42. Remaining macerated produce is carried again along path 66, now displaced longitudinally of the apparatus by the action of the pitched paddles of the main beater, and another threshing cycle begins. After repeated threshing through a plurality of cycles, for example, 10 to 15 cycles, the macerated material reaches the distal end 45 of the system and is ejected from the screen.

The importance of providing the satellite beaters with a large number (8) of shallow (2 to 4 inch) blades is now apparent. The stream of produce discharged along paths 70, 74, and 76 is substantially smooth, continuous, and free of lumps or clumps. Thus the layer of macerated material continuously sprayed onto the inner surface of screen 42 at first and second sieving regions 72 and 78 is of uniform thickness and of the minimum thickness possible, and therefore a maximum of free seeds is allowed to reach and pass through screen 42 at each sieving region.

Example: A threshing system in accordance with the invention has the following dimensions and operating parameters:

| Component | Diameter | Blade Height | Revolution Rate | Tip Speed |
| --- | --- | --- | --- | --- |
| Screen | 84 in. | NA | 30 rpm | NA |
| Main beater | 48 in. | 4 in. | 130 rpm | 27.2 fps |
| 1st sat. beater | 12 in. | 2 in. | 520 rpm | 27.2 fps |
| 2nd sat. beater | 12 in. | 2 in. | 420 rpm | 25.7 fps |
| 3rd sat. beater | 14 in. | 2 in. | 360 rpm | 25.7 fps |

From the foregoing description it will be apparent that there has been provided an improved system for threshing vined podded produce to open the pods, remove the seeds from the pods, and separate the seeds from the pods and vines wherein a main beater having a plurality of shallow, pitched paddles cooperates with three satellite beaters having a large number of shallow blades to provide two well-defined strikes of the produce against the main beater and two well-defined strikes of the produce at high speed and high incident angle against two different sieving regions of a rotating screen sieve for each threshing cycle of the system. Variations and modifications of the herein described threshing system, in accordance with the invention, will undoubtedly suggest themselves to those skilled in this art. Accordingly, the foregoing description should be taken as illustrative and not in a limiting sense.

What is claimed is:

1. A system for threshing podded produce to open the pods, remove the seeds from the pods, and separate the seeds from the empty pods and vines, comprising:

a) a cylindrical screen having a generally horizontal axis and being rotatable about said axis, said screen being receivable of said podded produce;

b) an elongate main beater disposed for rotation within said screen and having an axis disposed parallel with said screen axis and below a horizontal plane including said screen axis, said main beater having a generally cylindrical body and a plurality of individual paddles extending therefrom being discontinuous longitudinally of said beater body, the tips of said individual paddles being disposed in close proximity to said screen, said main beater being rotatable in the same direction as said screen to propel the tips of said paddles at a first linear tip speed to collect and thrust upwards along the inner surface of said screen said vined produce entering said screen;

c) a first satellite beater disposed for rotation within said screen generally above said main beater, said first satellite beater having a generally cylindrical body and a plurality of longitudinal blades extending radially therefrom, the tips of said blades being disposed in close proximity to said screen, said first satellite beater being rotatable in a direction opposite to the rotation direction of said screen and said main beater to propel the tips of said blades at a second linear speed substantially equal to said first linear tip speed, said first satellite beater being cooperable with said main beater to discharge a stream of said vined produce against a first region of said rotating screen;

d) a second satellite beater disposed for rotation within said screen, said second satellite beater having a generally cylindrical body and a plurality of longitudinal blades extending radially therefrom, the tips of said blades being spaced apart from said screen, said second satellite beater being rotatable in the same direction as said screen to propel the tips of said blades at a third linear speed; and e) a third satellite beater disposed for rotation within said screen, said third satellite beater having a generally cylindrical body and a plurality of longitudinal blades extending radially therefrom, the tips of said blades being disposed in close proximity to said screen, said third satellite beater being rotatable in a direction opposite to the rotation direction of said screen and said second satellite beater to propel the tips of said blades at a fourth linear speed substantially equal to said third linear tip speed, said third satellite beater being cooperable with said second satellite beater to collect vined produce from said first sieving region of said screen and to discharge said vined produce against said main beater and thence against a second region of said rotating screen.

2. A system in accordance with claim 1 wherein said paddles of said main beater have faces for directing said produce, and wherein said faces are pitched at an included angle to said axis of said main beater body.

3. A system in accordance with claim 2 wherein said included angle is about 25 degrees.

4. A system in accordance with claim 2 wherein said faces are raked at an angle from a radius of said main beater body.

5. A system in accordance with claim 4 wherein said rake angle is about 15 degrees.

6. A system in accordance with claim 1 wherein the height to which each main beater paddle extends above the surface of said beater body is less than about one-fifth the overall diameter of said beater.

7. A system in accordance with claim 6 wherein said height is one-twelfth the diameter of said main beater.

8. A system in accordance with claim 1 wherein said plurality of main beater paddles numbers at least 50.

9. A system in accordance with claim 1 wherein said main beater paddles are provided with a polymeric coating.

10. A system in accordance with claim 9 wherein said coating comprises ultra high molecular weight polyethylene.

11. A system in accordance with claim 1 further comprising a plurality of rollers, at least one of which is driven, mounted on a frame for rotatably supporting said cylindrical screen.

12. A system in accordance with claim 1 further comprising a hydraulic drive subsystem for rotating said cylindrical screen and said main, first satellite, second satellite, and third satellite beaters at predetermined rotational frequencies.

13. A system in accordance with claim 12 wherein the rotational frequencies of said main beater, said first satellite beater, said second satellite beater, and said third satellite beater are in fixed relationship and in a cooperative relationship with said cylindrical screen.

14. A system in accordance with claim 12 wherein said rotational frequencies are about 30 revolutions per minute (rpm) for said cylindrical screen, about 130 rpm for said main beater, about 520 rpm for said first satellite beater, about 420 rpm for said second satellite beater, and about 360 rpm for said third satellite beater.

15. A system in accordance with claim 1 wherein said first, second, third, and fourth linear tip speeds are greater than about 20 feet per second.

16. A system in accordance with claim 15 wherein said first and second linear tip speeds are about 27 feet per second.

17. A system in accordance with claim 1 wherein said third and fourth linear tip speeds are about 26 feet per second.

18. A system in accordance with claim 1 further comprising apparatus for collecting said sieved seeds, for winnowing chaff from said seeds, and for transporting said seeds to a collection point.

19. A system in accordance with claim 1 wherein each of said first, second, and third satellite beaters is provided with at least six blades.

20. A system in accordance with claim 1 wherein each of said first, second, and third satellite beaters is provided with eight blades.

21. A system in accordance with claim 1 wherein said blades of said first, second, and third satellite beaters are substantially coextensive with said main beater and said cylindrical screen.

22. A system in accordance with claim 1 wherein the clearance between said cylindrical screen and said paddles and blades of each of said main beater, said first satellite beater, and said third satellite beater, respectively, is less than one inch.

23. In a podded produce thresher having a rotating cylindrical screen, a main beater rotating within the screen in the same direction as the screen and having paddle tips moving at a first linear tip speed, a first satellite beater rotating within the screen in a direction opposite to the rotation direction of the screen and having blade tips moving at a second linear tip speed, a second satellite beater rotating within the screen in the same direction as the screen and having blade tips moving at a third linear tip speed, and a third satellite beater rotating within the screen in a direction opposite to the rotation direction of the screen and having blade tips moving at a fourth linear tip speed, a method for threshing podded produce to open the pods, remove the seeds from the pods, and separate the seeds from the empty pods and vines, comprising the steps of:

a) feeding the podded produce into one end of said rotating cylindrical screen;

b) compressing, macerating, and elevating the produce by said combined rotation of said main beater and said screen to open a portion of said pods;

c) discharging said macerated and elevated produce between said rotating main beater and said counter-rotating first satellite beater in a first stream against the inner surface of said cylindrical screen to open at a first location an additional portion of said pods;

d) releasing seeds through said screen at a first region of said screen;

e) discharging said macerated produce between said rotating second satellite beater and said counter-rotating third satellite beater in a second stream against said main beater;

f) directing said second stream from said main beater against the inner surface of said cylindrical screen to open at a second location an additional portion of said pods; and g) releasing seeds through said screen at a second sieving region.

24. The method in accordance with claim 23 further comprising the steps of:

a) selecting the rotational speeds of said main and first satellite beaters such that said first and second linear tip speeds are substantially identical; and b) selecting the rotational speeds of said second and third satellite beaters such that said third and fourth linear tip speeds are substantially identical.

25. The method in accordance with claim 23 wherein said macerating and elevating step and said first discharging step additionally advance said vined produce longitudinally of said rotating screen.

26. The method in accordance with claim 23 further comprising the step of discharging said macerated produce from the opposite end of said cylindrical screen.

27. The method in accordance with claim 23 wherein said steps b) through g) are conducted a plurality of times.

28. The method in accordance with claim 27 wherein said plurality of times is between 5 and 15.

29. The method in accordance with claim 23 further comprising the steps of collecting, winnowing, and conveying said seeds sieved at said first and second regions.

* * * * *